United States Patent
Furuya et al.

[19]

[11] Patent Number: 6,144,343

[45] Date of Patent: Nov. 7, 2000

[54] DISPLAY ANTENNA CENTER

[75] Inventors: Yoshiyuki Furuya; Ichiro Kataoka; Kunimitsu Aoki; Junichi Matsushita, all of Shizuoka, Japan

[73] Assignee: Yazaki Corporation, Tokyo, Japan

[21] Appl. No.: 09/053,778

[22] Filed: Apr. 2, 1998

[30] Foreign Application Priority Data

Apr. 15, 1997 [JP] Japan .................................. 9-097404

[51] Int. Cl.[7] ..................................................... G09G 5/00
[52] U.S. Cl. .............................. 343/713; 345/7; 340/980
[58] Field of Search ..................................... 343/711, 713; 345/7; 358/103, 250, 109

[56] References Cited

U.S. PATENT DOCUMENTS

| | | | |
|---|---|---|---|
| 4,884,135 | 11/1989 | Schiffman | 358/103 |
| 5,105,187 | 4/1992 | Plus et al. | 340/811 |
| 5,144,318 | 9/1992 | Kishi | 342/357 |
| 5,519,410 | 5/1996 | Smalanskas | 345/7 |

Primary Examiner—Don Wong
Assistant Examiner—James Clinger
Attorney, Agent, or Firm—Sughrue, Mion, Zinn, Macpeak & Seas, PLLC

[57] ABSTRACT

A display antenna center in which a display device is arranged in a lower portion of a windshield in the front portion of a vehicle and displays data of the vehicle. Further, a mirror is arranged in an upper portion of the display device and makes the vehicle data, which is displayed on the display device, to be recognized by a driver in the form of a virtual image. Furthermore, various antennas are arranged between the back of the mirror and the windshield corresponding to various types of information transmitting devices, and information sent from the corresponding information transmitting device is received by each of the antennas.

18 Claims, 4 Drawing Sheets

DISPLAY ANTENNA CENTER

BACKGROUND OF THE INVENTION

1. Field of the Invention

The present invention relates to a display antenna center in which various antennas are arranged close to a horizon display mounted on a vehicle such as an automobile.

2. Description of the Related Art

Conventionally, a global positioning system antenna, which will be referred to as a GPS antenna hereinafter, is incorporated into a vehicle such as an automobile, and GPS data including positional information sent from a GPS satellite is received by the GPS antenna. In accordance with the GPS data, positional information of the automobile is calculated, and a position of the automobile at present is displayed on a display device, or a running route of the automobile is recorded.

A traffic information communication system antenna, which will be referred to as a VICS antenna hereinafter, is incorporated into the automobile, and positional information and traffic congestion information sent from a beacon are received by this VICS antenna, and the information is displayed on a display device, so that the traffic congestion can be relieved.

Further, an automatic toll receiving system antenna, which will be referred to as an ETC antenna hereinafter, is incorporated into the automobile. By this ETC antenna, entrance toll booth information and exit toll booth information are received, and a toll necessary for running between the entrance toll booth and the exit toll booth is calculated, and this toll is settled by means of a prepaid card or the like.

In the case of attaching GPS antenna to an automobile, in order to receive electric waves effectively, it is arranged in a portion except for a steel sheet portion of the automobile, that is, the GPS antenna is arranged inside the dashboard or alternatively it is arranged in a lower portion of the tray located at the rear of the automobile, or alternatively it is directly arranged on the automobile body with a magnet.

Unless VICS antenna and ETC antenna are arranged in the front portion of a vehicle, it is impossible to provide a receiving effect of the antenna. Therefore, VICS antenna and ETC antenna are arranged on the instrument panel under the present condition.

When GPS antenna, VICS antenna and ETC antenna are arranged in the respective portions of a vehicle as described above, problems may be caused in designing, and further it is impossible to accomplish a high receiving performance of each antenna.

SUMMARY OF THE INVENTION

It is an object of the present invention to provide a display antenna center capable of improving the designs of various antennas and enhancing the receiving performance of the antennas.

In order to achieve the above object, the present invention provides a display antenna center comprising: a display section arranged in a lower portion of a windshield in a front portion of a vehicle for displaying data of the vehicle; an optical member arranged in an upper portion of the display section for making a driver recognize a virtual image of the data of the vehicle displayed in the display section; and a plurality of antennas arranged between a back of the optical member and the windshield and provided in accordance with a plurality of information transmitting devices, each for receiving information sent from each of the information transmitting devices corresponding to each of the antennas.

DETAILED DESCRIPTION OF THE PREFERRED EMBODIMENT

Figure 1:
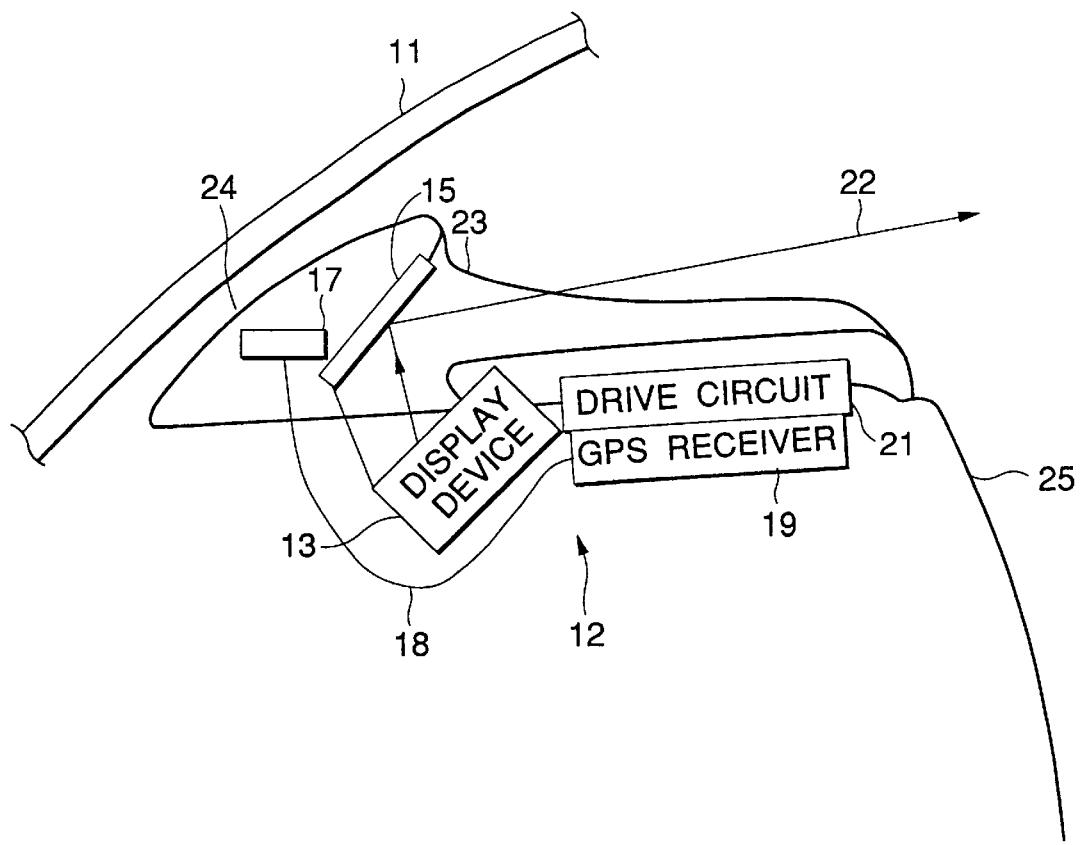
FIG. 1 is a side view of an embodiment of the display antenna center of the present invention.

Referring to the accompanying drawings, an embodiment of the display antenna center of the present invention will be explained below in detail. FIG. 1 is a side view of the embodiment of the display antenna center of the present invention.

In FIG. 1, there is provided a horizon display 12 in a lower portion of a windshield 11 arranged in the front portion of an automobile. This horizon display 12 includes: a display device 13 composed of thin film transistors (TFTs) for displaying information and data; a mirror 15 arranged between the display device 13 and the windshield 11; and a drive circuit 21 having a central processing unit, which will be referred to as a CPU hereinafter, not shown in the drawing.

Between the mirror 15 and the windshield 11, there is provided a GPS antenna 17 for receiving GPS data including positional information sent from a GPS satellite not shown in the drawing. This GPS antenna 17 is connected to a GPS receiver 19, into which GPS data sent from the GPS antenna 17 is inputted, through a signal line 18. The mirror 15 receives information and data, which has been displayed on the display device 13, in the form of optical information, and this optical information is reflected on the mirror 15 and outputted in the form of a virtual image 22.

The drive circuit 21 is arranged in an upper portion of the GPS receiver 19 and controls the display device 13 and GPS receiver 19. The GPS antenna 17, mirror 15 and display device 13 are covered with a panel 23.

This panel 23 is arranged in an upper portion of an instrument panel 25. Further, this panel 23 is arranged at the center of the instrument panel 25 which extends in a direction perpendicular to the surface of FIG. 1.

Figure 2:
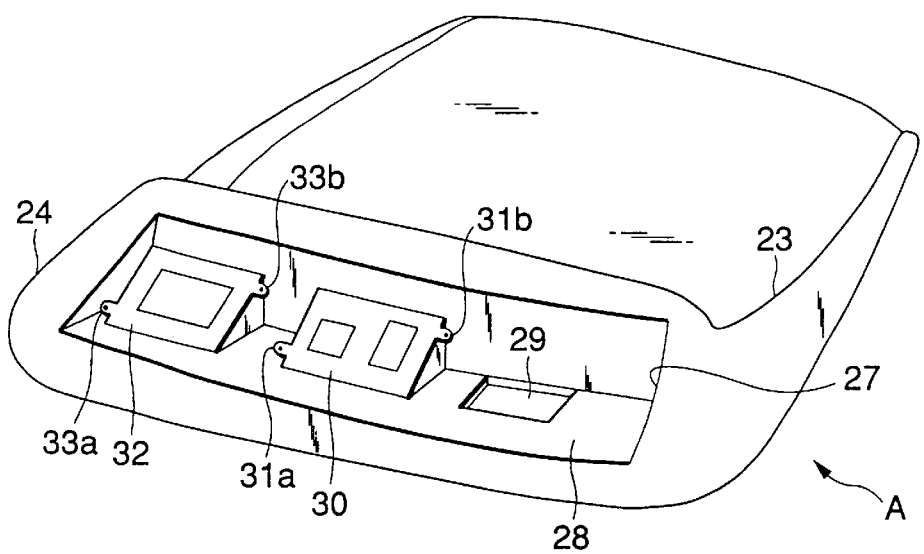
FIG. 2 is an arrangement view showing the detail of a cover.
Figure 3A:
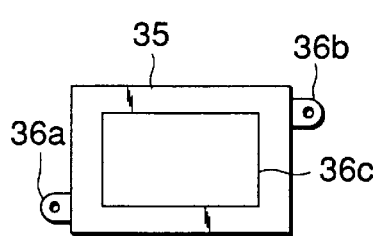
FIGS. 3(a) to 3(c) are arrangement views of various antennas.

FIG. 2 is an arrangement view showing the detail of a cover. In a front portion 24 of the panel 23, there is provided an opening portion 27. In a plane portion 28 of the opening portion 27, there is provided a groove portion 29. In this groove portion 29, the GPS antenna 17 is attached horizontally. As shown in FIG. 3(c), the GPS antenna 17 is formed into a square and provided with a receiving antenna 41.

In the plane portion 28, there are provided a VICS antenna holding member 30 and an ETC antenna holding member 32, which are arranged oblique to the plane portion 28 by a predetermined angle. In the VICS antenna holding member 30, there are formed screw holes 31a and 31b. In the ETC antenna holding member 32, there are formed screw holes 33a and 33b.

Figure 3B:
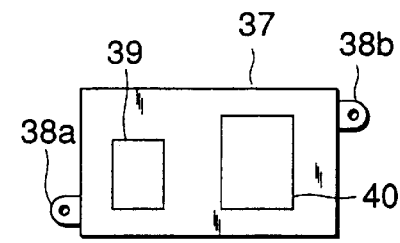
Figure 3C:
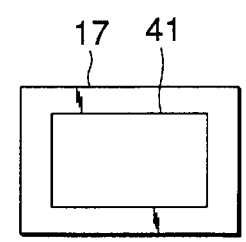

A VICS antenna 37 shown in FIG. 3(b) is attached to the VICS antenna holding member 30. The VICS antenna 37 receives positional information and traffic congestion information sent from a beacon. The VICS antenna 37 is provided with screw holes 38a and 38b corresponding to the screw holes 31a and 31b. Also, the VICS antenna 37 is provided with a light emitting portion 39 and a light receiving portion 40.

An ETC antenna 35 shown in FIG. 3(a) is attached to the ETC antenna holding member 32. The ETC antenna 35 receives entrance toll booth information and exit toll booth information respectively sent from the entrance toll booth and exit toll booth. The ETC antenna 35 is provided with screw holes 36a and 36b corresponding to the screw holes 33a and 33b. The ETC antenna 35 is also provided with a receiving antenna 36c.

Figure 4:
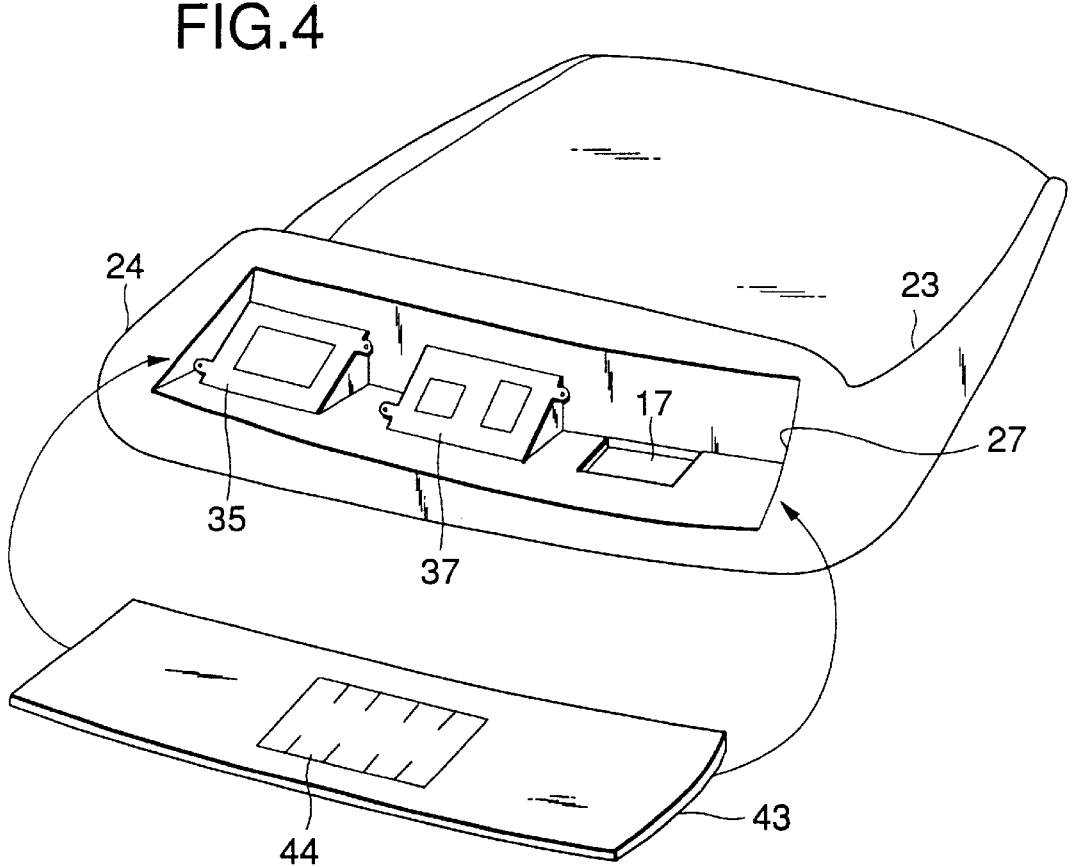
FIG. 4 is a view showing a state in which various antennas are mounted in an opening portion.

FIG. 4 is a view showing various antennas which are incorporated into the opening portion. As shown in FIG. 4, various antennas such as the GPS antenna 17, VICS antenna 37 and ETC antenna 35 are mounted in the opening portion 27. These various antennas are arranged between the mirror 15 and the front portion 24 of the panel 23.

The opening portion 27 is covered with a front cover 43. In this front cover 43, there is provided a light beacon transmitting section 44 made of black acrylic resin so that light can be received and emitted with respect to the VICS antenna 37.

In the above arrangement, information displayed on the display device 13 is reflected on the mirror 15, and the driver can recognize a virtual image of the information reflected on the mirror. Therefore, it is possible to ensure a distance from the driver's eye to the virtual image. Accordingly, it is possible to enhance the visibility.

Since the GPS antenna 17, VICS antenna 37 and ETC antenna 35 are integrally arranged between the back of the mirror 15 and the windshield 11 of the horizon display 12, the designs of these antennas can be improved, and further these antennas can easily receive information and data which are sent to them. Accordingly, the receiving performance of these antennas can be enhanced.

Figure 5:
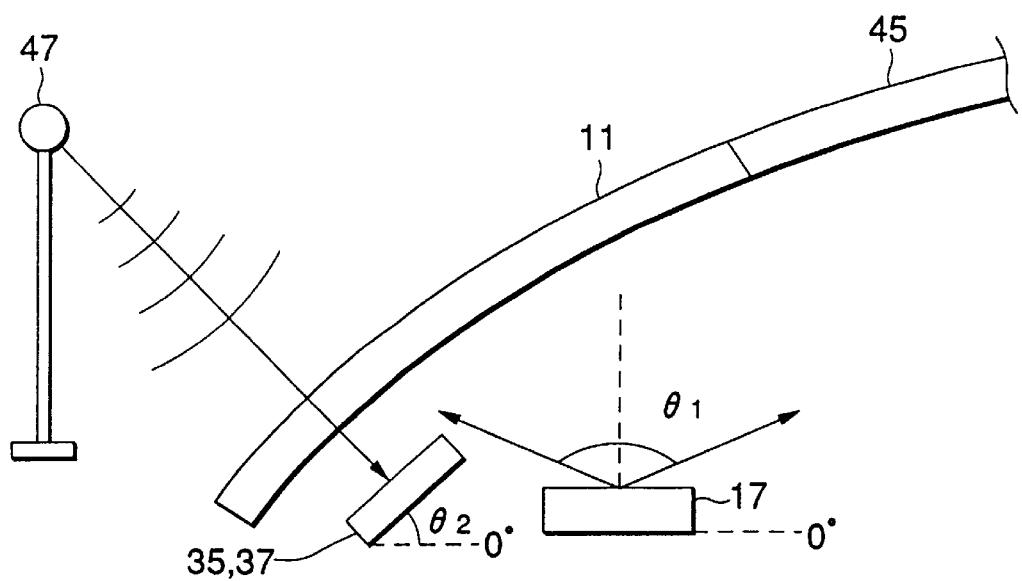
FIG. 5 is a schematic illustration for explaining the attaching angles of various antennas.

As shown in FIG. 5, the GPS antenna 17 is horizontally arranged in a lower portion of the windshield 11, that is, the GPS antenna 17 is arranged while an angle formed between the GPS antenna 17 and the horizontal surface is kept at an angle of 0°. This is because the directivity angle of the GPS antenna 17 is $\theta_1$, which is fairly large.

For example, when the GPS antenna 17 is obliquely arranged while an angle of the GPS antenna 17 with respect to the horizontal surface is kept at $\theta_2$, the GPS antenna 17 has a directivity angle $\theta_1$ on the basis of the predetermined angle $\theta_2$. Therefore, it becomes impossible for the GPS antenna 17 to receive GPS data from a portion on the side of a sunroof 45 of the windshield 11.

That is, when the GPS antenna 17 is arranged in a horizontal condition, it is possible for the GPS antenna 17 to most effectively receive GPS data sent from the GPS satellite in a range of the windshield 11.

It is preferable that the VICS antenna 37 and ETC antenna 35 are obliquely arranged in such a manner that they form the predetermined angle $\theta_2$ with respect to the horizontal surface. For example, as shown in FIG. 5, when the VICS antenna 37 is arranged in such a manner that it is oblique to the horizontal surface by the predetermined angle $\theta_2$, it becomes possible for the VICS antenna 37 to effectively receive light sent from a beacon 47.

Figure 6:
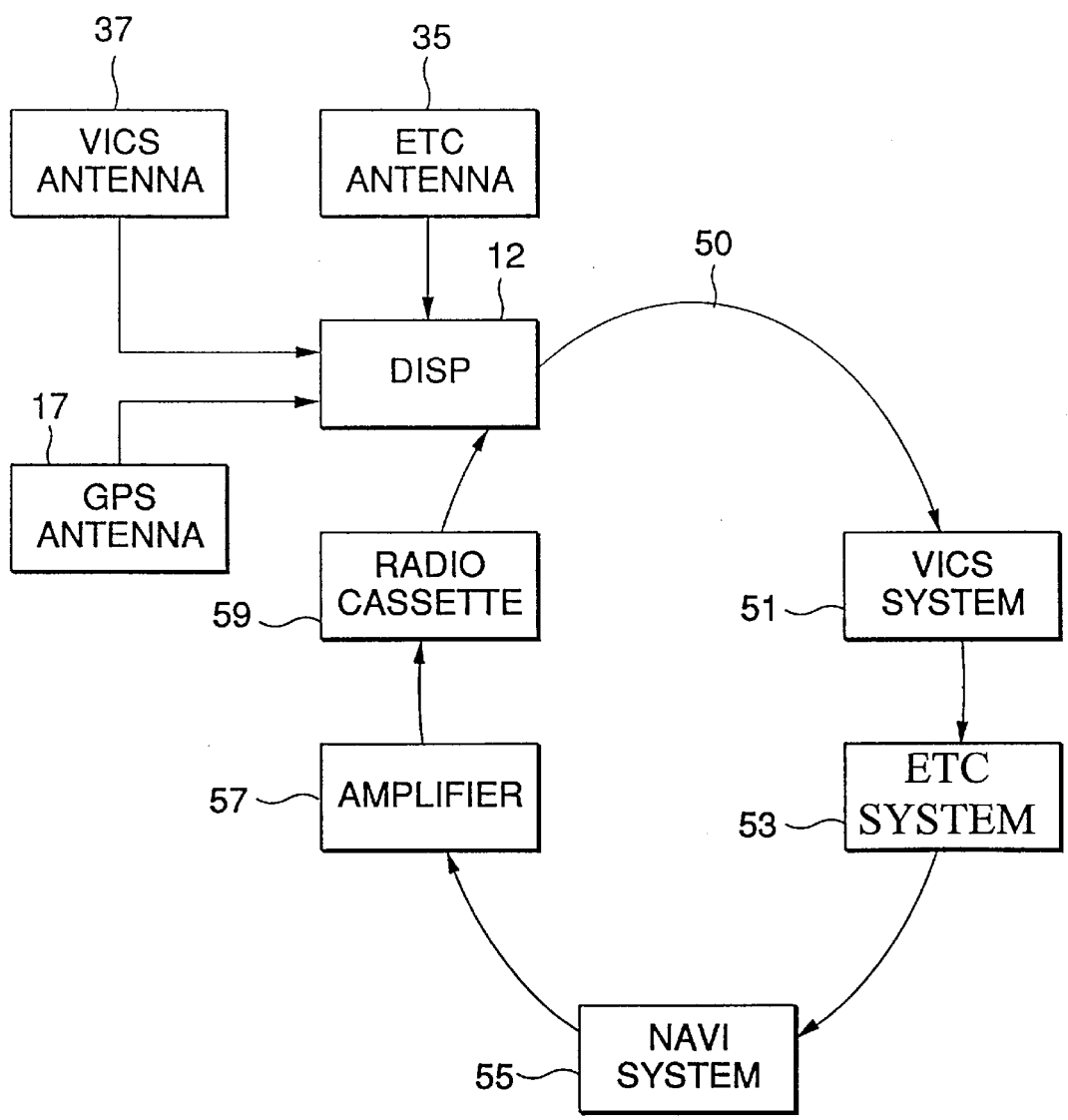
FIG. 6 is a block diagram showing the arrangement of a vehicle data transmitting system.

FIG. 6 is a block diagram showing the arrangement of a vehicle data transmitting system. The vehicle data transmitting system shown in FIG. 6 is incorporated into an automobile and composed of GPS antenna 17, VICS antenna 37, ETC antenna 35, display (DISP) 12 connected to these various antennas, VICS system 51, ETC system 53, navigation system 55, which will be referred to as NAVI system hereinafter, amplifier 57, radio cassette 59, and bus 50 which connects the above sections in a ring-shape.

In the arrangement described above, VICS data received by the VICS antenna 37 is inputted into the DISP 12 and transmitted from the DISP 12 to the VICS system 51 through the bus 50. Due to the foregoing, it is possible for the VICS system 51 to obtain the traffic congestion information from the VICS data.

ETC data received by the ETC antenna 35 is inputted into the DISP 12 and then transmitted from the DISP 12 to the ETC system 53 through the bus 50 and the VICS system 51. Due to the foregoing, it is possible for the ETC system 53 to settle the toll in accordance with the ETC data.

Further, GPS data received by the GPS antenna 17 is inputted into the DISP 12 and transmitted from the DISP 12 to the NAVI system 55 through the bus 50, VICS system 51 and ETC system 53. Due to the foregoing, it is possible for the NAVI system 55 to calculate the positional information of the automobile in accordance with the GPS data. Therefore, a position of the automobile at present can be displayed on the display device, and a running route of the automobile can be recorded.

In this connection, various antennas such as the GPS antenna, VICS antenna and ETC antenna are attached in this embodiment, however, the various antennas are not limited to the above specific embodiment, but other types of antennas may be attached to positions close to the positions at which the GPS antenna 17 and the others are attached.

According to the present invention, data of a vehicle is displayed on the display device, and the thus displayed data is formed into a virtual image by the optical member, so that it can be recognized by a driver. A plurality of types of antennas arranged between the back of the optical member and the windshield respectively receive information sent from the information transmitting devices corresponding to the antennas.

Since a plurality of types of antennas are integrally arranged between the back of the optical member and the windshield, it is possible to improve the designs of the various antennas, and further it is possible to enhance the receiving performance of the various antennas.

When the receiving surface of the GPS antenna is arranged in a horizontal condition, it is possible to most effectively receive GPS data sent from the GPS satellite in a range of the windshield.

Further, when the VICS antenna is obliquely arranged in such a manner that the receiving surface of the VICS antenna is oblique to the horizontal surface by a predetermined angle, it is possible to effectively receive light sent from a beacon.

What is claimed is:

1. A display antenna center comprising:

a display section arranged in a lower portion of a windshield in a front portion of a vehicle for displaying data;

an optical member arranged in an upper portion of said display section to output a virtual image of the data displayed in said display section; and a plurality of antennas arranged between said optical member and the windshield, each of said plurality of antennas adapted to receive information from one of a plurality of information transmitting devices, each of the plurality of information transmitting devices outputting information corresponding to a respective one of said plurality of antennas.

2. The display antenna center according to claim 1, wherein said plurality of antennas are arranged in an opening portion of a panel arranged in an upper portion of an instrument panel.

3. The display antenna center according to claim 1, wherein one of said plurality of antennas is a GPS antenna for receiving GPS data, and wherein a receiving surface of said GPS antenna is arranged substantially horizontally.

4. The display antenna center according to claim 1, wherein one of said plurality of antennas is a VICS antenna for receiving VICS data, and wherein a receiving surface of said VICS antenna is arranged obliquely at a predetermined angle from a horizontal orientation.

5. The display antenna center according to claim 1, wherein said display section is a display device comprising thin film transistors.

6. A display antenna center for a vehicle, comprising:

a display unit configured to display data; and a plurality of antennas adjacent to each other and disposed on and/or within a dashboard of the vehicle, wherein each of said plurality of antennas is adapted to receive information from one of a plurality of information transmitting devices, and wherein each of said plurality of information transmitting devices outputs information corresponding to a respective one of said plurality of antennas.

7. A display antenna center according to claim 6, wherein one of said plurality of antennas is a GPS antenna.

8. A display antenna center according to claim 7, wherein a receiving surface of said GPS antenna is disposed in a substantially horizontal orientation.

9. A display antenna center according to claim 8, wherein one of said plurality of antennas is a VICS antenna.

10. A display antenna center according to claim 9, wherein a receiving surface of said VICS antenna is arranged at a predetermined angle from a horizontal orientation.

11. A display antenna center according to claim 9, wherein one of said plurality of antennas is an ETC antenna.

12. A display antenna center according to claim 11, wherein a receiving antenna of said ETC antenna is arranged at a predetermined angle from a horizontal orientation.

13. A display antenna center according to claim 12, wherein said predetermined angle of said receiving antenna of said ETC antenna is not the same as said predetermined angle of said receiving surface of said VICS antenna.

14. A display antenna center according to claim 9, wherein said VICS antenna is adapted to receive light-based information.

15. A display antenna center according to claim 14, wherein said VICS antenna is adapted to emit light-based information.

16. A display antenna center comprising:

a GPS antenna;

a VICS antenna; and a ETC antenna, wherein said GPS antenna, said VICS antenna, and said ETC antenna are integrated into an upper portion of a vehicle dashboard located at a front of a vehicle.

17. A display antenna center according to claim 4, wherein said VICS antenna is adapted to receive light-based information.

18. A display antenna center according to claim 4, wherein said VICS antenna is adapted to emit light-based information.

* * * * *